US012790466B2

(12) United States Patent
Donelson et al.

(10) Patent No.: US 12,790,466 B2
(45) Date of Patent: Nov. 10, 2026

(54) CELLULOSE ESTER-BASED COMPOSITIONS AND ARTICLES FORMED THEREFROM

(71) Applicant: Eastman Chemical Company, Kingsport, TN (US)

(72) Inventors: Michael Eugene Donelson, Kingsport, TN (US); Robert Erik Young, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 379 days.

(21) Appl. No.: 18/000,700

(22) PCT Filed: Jun. 3, 2021

(86) PCT No.: PCT/US2021/035596

§ 371 (c)(1),
(2) Date: Dec. 5, 2022

(87) PCT Pub. No.: WO2021/252250

PCT Pub. Date: Dec. 16, 2021

(65) Prior Publication Data

US 2023/0203281 A1 Jun. 29, 2023

Related U.S. Application Data

(60) Provisional application No. 63/035,897, filed on Jun. 8, 2020.

(51) Int. Cl.
*C08L 1/14* (2006.01)
*C08K 5/11* (2006.01)
(Continued)

(52) U.S. Cl.
CPC .................. *C08L 1/14* (2013.01); *C08K 5/11* (2013.01); *C08L 31/04* (2013.01); *E04F 15/107* (2013.01);
(Continued)

(58) Field of Classification Search
None
See application file for complete search history.

(56) References Cited

U.S. PATENT DOCUMENTS 1,823,238 A 9/1931 Campbell
4,105,465 A 8/1978 Berger
(Continued)

FOREIGN PATENT DOCUMENTS

CN 101874067 A 10/2010
CN 107619546 A 1/2018
(Continued)

OTHER PUBLICATIONS

U.S. Appl. No. 18/553,740, filed Oct. 3, 2023, Eastman Chemical Co.

(Continued)

*Primary Examiner* — Laura C Powers
(74) *Attorney, Agent, or Firm* — Kenrick L. Vidale

(57) ABSTRACT

Disclosed is a cellulose ester-based composition, The cellulose ester-based composition of the present invention includes comprising at least 51% by weight cellulose ester based on the total weight of polymer in the composition and polyvinyl acetal. Related calendered articles and flooring articles are also described.

1 Claim, 1 Drawing Sheet

(51) Int. Cl.
*C08L 31/04* (2006.01)
*E04F 15/10* (2006.01)

(52) U.S. Cl.
CPC ....... *C08L 2205/22* (2013.01); *C08L 2207/20* (2013.01)

(56) References Cited

U.S. PATENT DOCUMENTS

| | | | | |
|---|---|---|---|---|
| 4,269,629 | A | 5/1981 | Zannucci | |
| 4,283,316 | A | 8/1981 | Bonsignore | |
| 4,357,168 | A | 11/1982 | Zweigle et al. | |
| 4,840,104 | A | 6/1989 | Ishida et al. | |
| 6,068,910 | A | 5/2000 | Flynn et al. | |
| 6,551,688 | B2 | 4/2003 | Moskala et al. | |
| 6,565,787 | B1 | 5/2003 | Sarver et al. | |
| 11,905,394 | B2 | 2/2024 | Feng et al. | |
| 2006/0058425 | A1 | 3/2006 | Mohanty et al. | |
| 2006/0078754 | A1 | 4/2006 | Murakami | |
| 2006/0110617 | A1 * | 5/2006 | Kitaike | C08F 265/06 428/522 |
| 2009/0036667 | A1 | 2/2009 | Hashimoto | |
| 2009/0081388 | A1 | 3/2009 | Takeda et al. | |
| 2010/0124647 | A1 | 5/2010 | Keller et al. | |
| 2011/0296780 | A1 | 12/2011 | Windmoeller | |
| 2013/0321723 | A1 | 12/2013 | Ishiguro et al. | |
| 2015/0183967 | A1 | 7/2015 | Ayabe et al. | |
| 2016/0160031 | A1 * | 6/2016 | Karagiannis | B32B 27/06 428/501 |
| 2017/0009056 | A1 | 1/2017 | Parker et al. | |
| 2018/0134016 | A1 | 5/2018 | Burns et al. | |
| 2018/0163413 | A1 | 6/2018 | Odum et al. | |
| 2019/0264007 | A1 | 8/2019 | Feng et al. | |
| 2022/0195739 | A1 * | 6/2022 | Bastin | E04F 15/107 |

FOREIGN PATENT DOCUMENTS

| | | | |
|---|---|---|---|
| CN | 108893071 | A | 11/2018 |
| CN | 1098632768 | B | 11/2021 |
| EP | 1024217 | A2 | 8/2000 |
| GB | 1092910 | A | 11/1967 |
| GB | 2489491 | A | 10/2012 |
| JP | 2004-196932 | | 7/2004 |
| WO | WO 2008/116214 | | 9/2008 |
| WO | WO 2010055777 | A1 | 5/2010 |
| WO | WO 2014169409 | A1 | 10/2014 |
| WO | WO 2015/098491 | A1 | 7/2015 |
| WO | WO 2018/017652 | A1 | 1/2018 |
| WO | WO 2018/057602 | A1 | 3/2018 |
| WO | WO 2018/089573 | A1 | 5/2018 |
| WO | WO 2020/028633 | A1 | 2/2020 |

OTHER PUBLICATIONS

"Research on Modification of Cellulose Acetate", Zhang Zhi, "*Chinese Master's Theses Full-text Database* Engineering Science and Technology I", Issue 6, B016-183, Jun. 15, 2016.

"Licowax, Licolub and Licocene for PVC Processing"; Oct. 2010; URL:http://siliconasyquimicos.com/index.php/component/k2/item/download/442_d6d526dde0709570d9fc4176752d3410.

"Paraloid™ K-125 Processing Aid for Vinyl"; Mar. 1, 2002, URL:http://www.dow.com/assets/attachments/buinsess/plastics_additives/paraloid_k/paraloid_k-125/tds/paraloidk-125.pdf.

"Practical Rubber Production Technology (2nd ed.)", Ji Kuijiang, Chemical Industry Press, pp. 297-298.

"Sealing Adhesives (1st ed.)", Yang Shuli et al., Sinopec Press, pp. 109-111.

Balser, Klaus, et al.; "Cellulose Esters"; Ullmann's Encyclopedia of Industrial Chemistry, vol. 7, pp. 333-380, 2012.

European Examination Report dated Jan. 3, 2025 received in European Application No. 21735106.3.

Hanselmann, Ralf; "Glasubergangstemperatur"; Rompp online 4.0, Dokumentenkennung RD-07-01216, Jul. 1, 2007; URL:https://roempp.thieme.de/roempp4.0/do/data/RD-07-01216.

Notification of Transmittal of the International Search Report and the Written Opinion of the International Searching Authority, or the Declaration with Date of Mailing Sep. 17, 2021 received in International Application No. PCT/US2021/035601.

Notification of Transmittal of the International Search Report and the Written Opinion of the International Searching Authority, or the Declaration with Date of Mailing Jan. 29, 2021 received in International Application No. PCT/US2020/054704.

Notification of Transmittal of the International Search Report and the Written Opinion of the International Searching Authority, or the Declaration with Date of Mailing Nov. 19, 2021 received in International Application No. PCT/US2021/035598.

Notification of Transmittal of the International Search Report and the Written Opinion of the International Searching Authority, or the Declaration with Date of Mailing Sep. 16, 2021 received in International Application No. PCT/US2021/035599.

Notification of Transmittal of the International Search Report and the Written Opinion of the International Searching Authority, or the Declaration with Date of Mailing Sep. 29, 2021 received in International Application No. PCT/US2021/035595.

Notification of Transmittal of the International Search Report and the Written Opinion of the International Searching Authority, or the Declaration with Date of Mailing Sep. 29, 2021 received in International Application No. PCT/US2021/035596.

Zepnik, Stefan, et al.; "Cellulose Acetate for Thermoplastic Foam Extrusion" In: "Cellulose—Biomass Conversion"; InTech, Aug. 29, 2013. pp. 17-44+C24:C33.

* cited by examiner

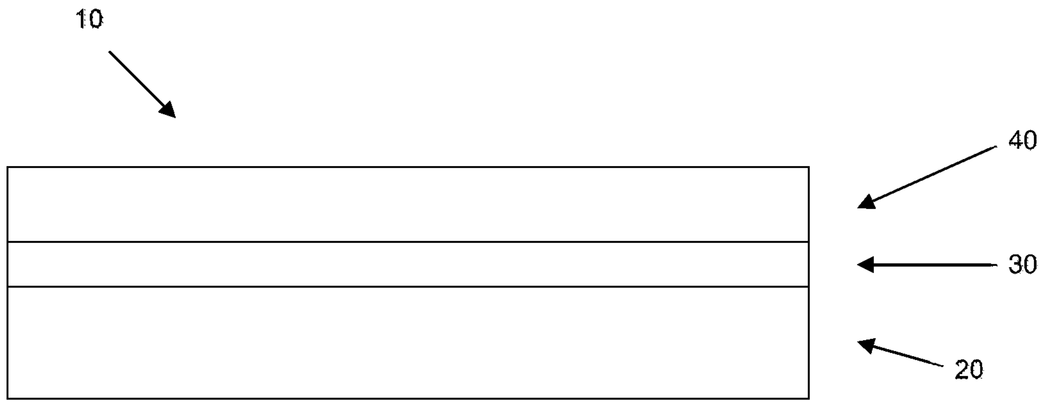
10
40
30
20

CELLULOSE ESTER-BASED COMPOSITIONS AND ARTICLES FORMED THEREFROM

CROSS-REFERENCE TO RELATED APPLICATION(S)

This application is a national stage filing under 35 USC § 371 of International Application Number PCT/US2021/035596, filed on, Jun. 3, 2021 which claims the benefit of the filing date to U.S. Provisional Application No. 63/035,897, filed on Jun. 8, 2020, the entire disclosures of which are incorporated by reference herein.

FIELD OF THE INVENTION

The present invention generally relates to cellulose ester-based compositions as well as articles formed from said compositions.

BACKGROUND OF THE INVENTION

As the chemical industry and consumers look for environmentally friendly alternatives to certain chemicals, the growth of cellulose esters has increased significantly. Cellulose esters are plant-based compounds derived from cellulose, a polysaccharide found in wood, plants and plant products such as cotton. Cellulose esters have been used in a wide variety of consumer and industry end-product uses such as coatings and coating ingredients, objects such as eyeglass frames, disposable knives, forks, spoons, plates, cups and straws, toothbrush handles automotive trim, camera parts and disposable syringes. Cellulose esters also have intermediate and B2B product uses, often in the form of fibers, films, sheets and the like. Published studies indicate that the cellulose esters market is projected to grow from USD 9.27 billion in 2018 to USD 12.43 billion by 2023, at a CAGR of 6% from 2018 to 2023.

One end-use application of particular interest is so-called “resilient” flooring products that traditionally include vinyl sheet flooring, vinyl composite tile, luxury vinyl tile, rubber and linoleum. In this market, polyvinylchloride (PVC) has historically been utilized but recently has encountered lower popularity due to environmental concerns. WO2018017652A1 and WO2018/089591A1, assigned to the assignee of the present invention, describe innovations which facilitate use of environmentally-friendly cellulose esters in various applications.

Despite the commercial growth of cellulose ester use, it is acknowledged in the art that challenges exist in utilizing cellulose esters in certain applications. For example, it is noted in U.S. Published Patent Application No. 2016/0068656 that, while cellulose esters are generally considered environmentally-friendly polymers and are derived from renewable sources like wood pulp, they have not been widely used in plastic compositions due to certain processing difficulties. The fact that production of film and sheet with cellulose esters has historically been limited to standard extrusion and solvent casting methods is also discussed in the above-referenced WO2018017652A1, assigned to the assignee of the present invention.

One characteristic known in the art to be generally relevant to and desirable for processability of a formulation or composition is referred to as “shear thinning”. Shear thinning is generally defined as a decrease in the viscosity of a fluid when placed under increasing shear strain forces. Compositions with advantageous levels of shear thinning characteristics can be processed more easily, with lower energy costs and reduced equipment wear, for example in mixing processes to blend and homogenize the composition and processes such as extrusion, injection molding, calendering and the like for forming the composition into useful articles such as films or sheets. Many PVC materials used in flooring, particularly in conjunction with flooring articles or components formed via calendering, typically inherently shear thin during processing. Shear thinning is therefore particularly relevant in the pursuit of alternatives for polyvinylchloride in the resilient flooring market.

In addition to processability, compositions useful in resilient flooring articles must also satisfy other attributes that are critical for commercial success or may also be required to meet governmental standards for use. For example, flooring articles must often meet certain standards of fire safety or flammability. Also, flooring can exhibit acoustic damping characteristics that are highly desirable for reducing noise in living and working environments. Acoustic damping for flooring applications may be characterized by dynamic mechanical analysis and quantitatively by measuring or recording the magnitude of the tan delta peak at room temperature. Further, especially with regard to a multilayer flooring article, the top or wear layer must remain substantially transparent while still minimizing the transmission of ultraviolet energy to other layers, in particular an underlying layer which may carry a printed design or image (often called a print layer), which could be damaged by exposure to UV radiation.

Despite advances in the technology, a continuing unmet need remains for compositions useful in flooring applications that employ environmentally-friendly materials while exhibiting processing, acoustic dampening, weatherability, flammability and other performance characteristics comparable to if not exceeding that of polyvinylchloride flooring.

SUMMARY OF THE INVENTION

In a first aspect, the present invention relates to a cellulose ester-based composition. The cellulose ester-based composition of the present invention includes at least 51% by weight cellulose ester based on the total weight of polymer in the composition and polyvinyl acetal, In one or more embodiments, cellulose ester-based composition comprises a disperse phase of polyvinyl acetal in a continuous phase of the cellulose ester.

In another aspect, the present invention relates to a calendered article. The calendered article of the present invention is formed from a cellulose ester-based composition that includes at least 51% by weight cellulose ester based on the total weight of polymer in the composition and polyvinyl acetal. In one or more embodiments, the composition comprises a disperse phase of polyvinyl acetal in a continuous phase of the cellulose ester.

In yet another aspect, the present invention is directed to a flooring article and more particularly a multilayer flooring article or a multilayer resilient flooring article that includes a. The flooring article of the present invention includes at least one layer of a cellulose ester-based composition that includes at least 51% by weight cellulose ester based on the total weight of polymer in the composition and polyvinyl acetal. In one or more embodiments, the composition comprises a disperse phase of polyvinyl acetal in a continuous phase of the cellulose ester.

Further aspects of the invention are as disclosed and claimed herein.

BRIEF DESCRIPTION OF THE DRAWINGS

FIG. 1 is a side elevational view of an embodiment of a multilayer resilient flooring article of the present invention.

DETAILED DESCRIPTION

For avoidance of doubt, it is expressly provided for that the information and descriptions herein regarding features or elements of one aspect of the present invention are asserted as applicable to and are relied on to also support those features and elements when described with regard to other aspects of the invention.

In a first aspect, the present invention is directed to a cellulose ester-based composition. The cellulose ester-based composition of this aspect of the present invention includes cellulose ester and polyvinyl acetal. In one or more embodiments, the cellulose-ester based composition includes a disperse phase of said polyvinyl acetal in a continuous phase of said cellulose ester. As used herein, the phrase "cellulose ester-based composition" is intended to describe compositions in which cellulose ester is the predominant polymer component of the composition, polymer components defined as components with repeating monomeric units and a molecular weight of at least 10,000 Da. "Predominant" can mean that (a) the weight percent cellulose ester is greater than the weight percent of any other polymer component; or (b) the weight percent cellulose ester is greater than the sum of the weight percents of all other polymer components; or (c) both (a) and (b). In one or more embodiments, the cellulose ester-based composition is a plasticized cellulose ester-based composition that includes a plasticizer.

The cellulose ester-based composition of the present invention includes a cellulose ester. A cellulose ester is generally defined to include cellulose esters of one or more carboxylic acids and are described for example in U.S. Pat. Nos. 5,929,229 and 10,364,345, assigned to the assignee of the present invention, the contents and disclosure of which are incorporated herein by reference. Non limiting examples of cellulose esters include cellulose acetate, cellulose propionate, cellulose butyrate, so-called mixed acid esters such as cellulose acetate propionate and cellulose acetate, and combinations thereof. In one or more embodiments, the at least one cellulose ester is chosen from cellulose acetate propionate, or cellulose acetate butyrate and combinations thereof. In one or more embodiments, the at least one cellulose ester is cellulose acetate propionate. In one or more embodiments, the at least one cellulose ester is cellulose acetate butyrate. In one or more embodiments, the at least one cellulose ester is a combination of cellulose acetate propionate and cellulose acetate butyrate.

In one or more embodiments, the amount of the cellulose ester in the cellulose ester-based composition is between 20% and 99% by weight, or between 25% and 99%, or between 30% and 99%, all based on the total weight of the plasticized cellulose ester-based composition. In one or more embodiments, the amount of cellulose ester is at least 50% or at least 70% or at least 99% based on the total weight of polymer in the cellulose ester-based composition.

The cellulose ester of the present invention may be characterized using one or more characteristics. For example, in one or more embodiments, the cellulose ester may have a number average molecular weight ("Mn") that is in the range of from 20,000 Da to 100,000 Da. In one or more embodiments, the cellulose ester has a Mn that is in the range of from about 20,000 Da to about 80,000 Da.

The cellulose ester may have in one or more embodiments a solution ball-drop viscosity of 2 to 40 or 4 to 30 or 5 to 20 seconds as measured by ASTM D817.

The cellulose ester may have in one or more embodiments one or more of a hydroxyl degree of substitution (DSOH) of from 0.1 to 0.8; an acetyl degree of substitution of from of from 0.1 to 0.8; a propionyl degree of substitution (DSPR) of from 1.4 to 2.8; or alternative to the propionyl, a butyryl degree of substitution (DSBU) of from 1.4 to 2.8. By way of brief background, DSOH, DSAC, DSPR and DSBU are measures of the degree of esterification for a given cellulose ester. Cellulose has three hydroxyls per anhydroglucose unit, located at the C2, C3 and C6 carbons, that can be esterified to varying degrees and in different ratios with various acyl groups, with the specific type of cellulose ester formed depending on the functionalization of the hydroxyl groups. Cellulose acetate propionate of this invention has a DSAC of approximately 0.2, a DSPR of approximately 2.5 and a DSOH of approximately 0.3. Cellulose acetate butyrate of the present invention has a DSAC of approximately 1.0, a DSBU of approximately 1.7 and a DSOH of approximately 0.3.

The cellulose ester may in one or more embodiments have a glass transition temperature (Tg) of 50° C. to 150° C. or from 70° C. to 120° C. or no more than 160° C.

The cellulose ester may in one or more embodiments have a percent crystallinity of less than 20% or less than 15% or less than 10% or less than 5% or from 5% to 10% or from 5% to 15% or from 5% to 20% or from 10% to about 20%. Crystallinity is described herein using, and measured in the context of the present invention from, the second heat cycle in accordance with ASTM D3418 and assuming an enthalpy of melting of 14 cal/g for the cellulose esters. In this method, the amount of crystallinity is measured under a prescribed heating history, more particularly the "$2^{nd}$ cycle" cooling and heating in a DSC per ASTM D3418. In this method, the sample is first heated in the DSC to above its melting temperature to erase any prior crystallinity (i.e. the "first heat cycle"). Next the sample is cooled at 20 degrees C. per minute to below Tg, and then reheated at the same rate to above the melting temperature again (the "$2^{nd}$ heat cycle"). During this cooling and $2^{nd}$ heating, the material will recrystallize to a certain degree, and this amount of crystallization is measured in the scan as the enthalpy of melting at the melting temperature.

The cellulose ester-based composition of the present invention includes polyvinyl acetal. In one or more embodiments, the polyvinyl acetal is polyvinyl butyral. In one or more embodiments, the polyvinyl butyral has a residual OH content ranging from 8-35 wt % PVOH based on the weight of the polyvinyl butyral. In one or more embodiments, the polyvinyl butyral may have a unplasticized glass transition temperature of between 60° C. and 90° C. In one or more embodiments, the polyvinyl butyral resins may have a molecular weight between 10,000 and 300,000 daltons (Mw). Polyvinyl acetals, including polyvinyl butyral, are known in the art and described for example in U.S. Pat. No. 10,364,345, assigned to the assignee of the present invention and previously incorporated herein by reference. Suitable polyvinyl acetals for the present invention are polyvinyl butyrals commercially available from Eastman Chemical Company as a film under the trade name Saflex™ and as a resin under the tradename Butvar™.

In one or more embodiments, the polyvinyl acetal is waste polyvinyl acetal material or the polyvinyl butyral is waste polyinyl butyral material. The term "waste" as used herein is intended to include without limitation material, resin, film or laminates sourced from industrial scrap, other post-industrial material, off-spec material, post-consumer material, selvedge, film and film scrap, coatings and coatings scrap, recycled glass laminates and combinations thereof, as well as processed forms of these materials such as for example materials that have been separated, decontaminated, purified or cleansed, or physically reduced in sample or particle size. In one or more embodiments, the waste polyvinyl butyral material further includes a plasticizer.

In one or more embodiments, the amount of polyvinyl acetal in the cellulose ester-based composition is between 1% and 49% by weight, or between 1% and 35%, or between 1% and 30% by weight based on the total weight of the cellulose ester-based composition. In one or more embodiments, the amount of polyvinyl acetal in the cellulose ester-based composition is at least 3% by weight or at least 4% by weight or at least 5% by weight based on the total weight of the cellulose ester-based composition. In one or more embodiments, the amount of polyvinyl acetal is no more than 49% or no more than 45% or no more than 40% based on the total weight of polymer in the cellulose ester-based composition.

In one or more embodiments, the sum of the percent by weight of cellulose ester-based on the total weight of polymer in said composition and the percent by weight of said polyvinyl acetal based on the total weight of polymer in said composition is at least 90% by weight or at least 92% by weight or at least 95% by weight or at least 96% by weight or at least 97% by weight or at least 98% by weight or at least 99% by weight based on the total weight of polymer in said composition.

The cellulose ester-based composition of the present invention optionally includes plasticizer and, when it includes a plasticizer, may be referred to as a plasticized cellulose-ester-based composition. In one or more embodiments. In one or more embodiments, the cellulose ester-based composition includes from 1% to 40% by weight or from 1% to 30% by weight of said plasticizer based on the total weight of polymer in the composition. In one or more embodiments, the plasticizer is at least in part sourced from a waste polyvinyl acetal material that includes plasticizer and the polyvinyl acetal of the composition is waste polyvinyl acetal material or waste polyvinyl butyral material that includes the plasticizer.

The plasticizer may be any plasticizer known in the art useful for plasticizing cellulose esters, including for example aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic triester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, citric acid ester plasticizer, hydroxyl-functional plasticizer, or combinations thereof. In one or more embodiments, the plasticizer is chosen from the group consisting of triethylene glycol 2-ethyl hexanoate (3GEH), acetyl triethyl citrate and combinations thereof. In one or more embodiments, the plasticizer is selected from the group consisting of triethylene glycol 2-ethyl hexanoate, dioctyl adipate, di-n-hexyl azelate and combinations thereof.

The composition of the present invention may further include one or more of processing aids, impact modifiers and roll release agents. In one or more embodiments, the plasticized cellulose ester-based composition of the present invention may include at least one roll release agent. Suitable roll release agents are known in the art and are described for example in U.S. Pat. No. 6,551,688, the contents and disclosure of which are incorporated herein by reference. Examples of suitable roll release agents include without limitation lubricants that may be exemplified by waxes such as amide waxes, olefin waxes, oxidized olefin waxes, fatty acids, fatty acid esters, fatty acid salts, saponified fatty acid salts and combinations thereof. Examples of a fatty acid esters include esters of montanic acid. In one or more embodiments, the roll release agent or lubricant is a fatty acid ester selected from the group consisting of butylene glycol ester of montanic acid, glycerol ester of montanic acid, pentaerythryitol ester of montanic acid and combinations thereof.

When roll release agents are included in the present invention, they are typically present in an amount of about 0.1% to about 2.0% roll release agent by weight based on the total weight of the composition. In one or more embodiments, the composition of the present invention includes 0.1% to 1.0% by weight roll release agent based on the total weight of the composition. In one or more embodiments, the composition of the present invention includes 0.1% to 0.5% by weight roll release agent based on the total weight of the composition. In one or more embodiments, the composition of the present invention includes 0.5% to 1.0% by weight roll release agent based on the total weight of the composition. In one or more embodiments, the composition of the present invention includes 1.0% to 2.0% by weight roll release agent based on the total weight of the composition. In one or more embodiments, the composition of the present invention includes 1.5% to 2.0% by weight roll release agent based on the total weight of the composition.

The present invention may further include at least one processing aid. Processing aids may for example improve the texture and "fusion" of the melt, improve melt strength, reduce composition melting time, reduce overall processing time and help with metal release from calendering rolls. Processing aids are known in the art and may be derived for example from acrylics, and acrylic copolymers although processing aids based on styrenics, carbonates, polyesters, other olefins, and siloxanes are known and commercially available. Suitable processing aids are commercially available and include without limitation Paraloid™ K-125 available from Dow; Kane-Ace® PA-20, PA-610, B622, MR01 and MP90 available from Kaneka Corporation; and Ecdel™ available from Eastman Chemical Company. In one or more embodiments, the at least one processing aid includes one or more of acrylic polymer, an acrylic copolymer, a styrenic polymer, a carbonate polymer, a polyester polymer, an olefin polymer and a siloxane polymer. In one or more embodiments, the at least one processing aid is selected from the group consisting of an acrylic polymer or an acrylic copolymer. In one embodiment, the processing aid comprises a Kane-Ace® acrylic processing aid.

The amount of processing aid present in the present invention may vary depending on, the type of processing aid and its molecular weight and viscosity, the other components of the composition and the composition's end-use application. When processing aids are included in the present invention, they are typically present in an amount of 0% to about 3.0% by weight impact modifier based on the total weight of the composition. In one or more embodiments, the composition of the present invention includes 0.1% to 6.0% by weight processing aid based on the total weight of the composition. In one or more embodiments, the composition of the present invention includes 0.5% to 6.0% by weight processing aid based on the total weight of the composition. In one or more embodiments, the composition of the present invention includes 0.5% to 3.0% by weight processing aid based on the total weight of the composition.

The present invention may also include at least one impact modifier. Examples of impact modifiers include core-shell polymers based on acrylics, including acrylic polymers, methacrylate butadiene styrene (MBS) polymers, silicone-acrylic polymers and combinations thereof. Other suitable impact modifiers include acrylonitrile-butadiene styrene (ABS), ethylene vinyl acetate copolymers, chlorinated polyethylenes, ethylene copolymers and combinations thereof. The at least one impact modifier, if present, is typically present in the composition of the present invention in an amount of 1% to about 20% by weight based on the total weight of the composition.

The composition of the present invention may further include one or more other optional ingredients or components. Non-limiting examples of such ingredients or components include fillers such as for example calcium carbonate, silica, talc, clay, glass beads and glass fibers and clay; flame retardants, lubricants, pigments, dispersing aids, biocides, antistatic agents, water repelling additives, rodenticides, dyes, colorants and the like. Lubricants may be utilized and their levels increased, for example to improve roll release, as polyvinyl acetal content increases. For example, in one or more embodiments wherein the amount of polyvinyl acetal is 0.5 to 30% or more based on the total weight of the cellulose ester-based composition, the cellulose ester-based composition may include at least 0.1% to 3.0% by weight lubricant based on the total weight of the cellulose ester-based composition. Suitable lubricants include amide waxes, olefin waxes, oxidized olefin waxes, fatty acids, fatty acid esters, fatty acid salts, saponified fatty acid salts and combinations thereof, with montanic waxes being preferred.

In one or more embodiments, the composition of the present invention exhibits a haze value of more than 10% or more than 20% or more than 30% or more than 40% when measured in accordance with ASTM D1003 at an article thickness of 60 mils or greater.

An important feature of the composition of the present invention is its [unexpected] sound attenuating benefits. Parameters known to be useful in assessing sound attenuation include (i) Young's modulus, for which a decrease or reduction correlates to improvement in sound attenuation and (ii) Tan Delta which is the ratio of loss modulus to the storage modulus as function of temperature and where an increase in amplitude of the peak correlates to an improvement in sound attenuation. In one or more embodiments, the present invention exhibits a Young's modulus in one or both of the machine direction and the transverse direction of less than 14000 MPa or less than 1300 MPa or less than 1200 MPa or less than 1100 MPa or less than 1000 MPa or less than 900 MPa or less than 800 MPa as measured according to ASTM D-882. In one or more embodiments, the present invention exhibits a Tan Delta of greater than 0.100 or greater than 0.125 or greater than 0.150 or greater than 0.175 or greater than 0.200 as measured according to ASTM D4065.

Another important feature of the plasticized cellulose ester-based composition of the present invention is its unexpected lower zero shear viscosity when compared to compositions with cellulose ester but without polyvinyl acetal. The absolute level of zero shear viscosity dictates the temperature required to process a sample. To demonstrate the surprising viscosity decrease characteristics of the plasticized cellulose ester-based compositions of the present invention, Applicants herein compare the complex viscosity in Poise for the control resin, a cellulose ester-based composition without polyvinyl acetal, at a shear rate of 1 $sec^{-1}$ to the complex viscosity in Poise at a shear rate of 1 $sec^{-1}$ for the compositions of the present invention to determine a Total Complex Viscosity Reduction (TCVR) according to the following equation:

$$\text{TCVR }(\%)=[(V1-V2)/V1]\times 100$$

wherein $V_1$ is the complex viscosity in Poise at a shear rate of 1 $sec^{-1}$ for the control resin and $V_2$ is the complex viscosity in Poise at a shear rate of 1 $sec^{-1}$ for the PVB modified resins. A large change in TCVR indicates the material can be processed at a lower temperature resulting in lower energy utilization and less potential degradation. The data in Table 3 below shows that compositions of the present invention may be processed a temperature about 20° C. cooler than the control resin and have similar viscosity. The shear rate is measured according to ASTM D-4440 at temperatures from 150° C. to 170° C.

In one or more embodiments, the plasticized cellulose ester-based composition of the present invention exhibits a total complex viscosity reduction (TCVR) of at least 60%.

Yet another feature of the composition of the present invention is the unexpectedly enhanced ductility as evidenced by the increase in break strain % measured in one or both of machine direction (MD) and transverse direction (TD). In one or more embodiments, the present invention exhibits a break strain % in the machine direction (MD) of more than 5% or more than 10% or more than 15% or more than 20% or more than 25% or more than 30% as measured according to ASTM D-882. In one or more embodiments, the present invention exhibits a break strain % in the transverse direction of more than 1% or more than 2% or more than 3% or more than 4% or more than 5% or more than 6% as measured according to ASTM D-882.

In one or more embodiments, the composition of the present invention is suitable for or capable of forming a calendered article such as for example a sheet or film. Accordingly, in an aspect, the present invention relates to a calendered article comprising or formed from a cellulose ester-based composition that includes at least 51% by weight cellulose ester based on the total weight of polymer in the composition and polyvinyl acetal. As previously noted, information and description set forth in regard to features and elements of the plasticized cellulose ester-based composition aspect of the present invention or other aspects are intended to be applicable to and fully support this calendered article aspect as well as all other aspects.

By use of the phrase "calendered article" the present invention intends to describe articles such as films or sheets formed using a calendering method with a molten polymer wherein the molten polymer is forced through the nips of counterrotating rolls to form a film or sheet, gradually squeezed down to a film or sheet of final thickness by optionally passing through additional rolls having a similar counterrotating arrangement (with the roll arrangements typically referred to as a "stack"); subjecting the film or sheet to additional treatment, such as for example stretching, annealing, slitting or the like and then winding the formed article on a winder. Calendering and calendered articles as used herein are described in more detail in U.S. Published Patent Application No. US2019/256674, assigned to the assignee of the present invention, the contents and disclosure of which are incorporated herein by reference.

In one or more of these embodiments, the cellulose ester-based composition of the present invention has a melt viscosity according to ASTM 3835 of 1000 Poise to 5000 Poise or 2000 Poise to 5000 Poise at a temperature of 190° C. and a shear rate of 628 $s^{-1}$. In one or more of these embodiments, the cellulose ester-based composition of the present invention may be capable of being calendered at the temperature range of the glass transition temperature (Tg) of the composition (in ° C.) plus 20° C. to the Tg of the composition in ° C. plus 100° C. With a view toward these embodiments, an aspect of the present invention is a calendered article formed from the plasticized cellulose ester-based composition of the present invention, particularly wherein the calendered article is a film or sheet and more particularly wherein the calendered article is a sheet or film that useful for or that forms a layer of a multilayer resilient flooring article.

Though the preceding aspect of the present invention describes a utility of the plasticized cellulose ester-based composition of the present invention in the field of calendering and calendered articles, one of ordinary skill in the art will appreciate that the composition of the present invention may also be useful in forming coatings and coating components and articles by known methods other than calendering, such as for example extrusion, injection molding, blow-molding, additive manufacturing (3D printing), profile extrusion, blown film, multilayer film, sheet lamination and the like. Examples of such articles may include without limitation eyeglass frames, disposable knives, forks, spoons, plates, cups and straws, toothbrush handles, automotive trim, camera parts and disposable syringes. The composition of the present invention is also useful in intermediate and B2B product uses such as fibers, films, sheets and the like.

The plasticized cellulose ester-based composition of the present invention may be useful in forming a flooring article, a calendered flooring article, a multilayer resilient flooring article, a layer of a multilayer flooring article, a calendered layer of a flooring article or a or calendered layer of a multilayer resilient flooring article. Accordingly, in another aspect, the present invention is directed to a flooring article. In one or more embodiments, the flooring article of this aspect of the present invention may be a multilayer flooring article that includes at least one layer. In one or more embodiments, the at least one layer may be a calendered layer. Flooring articles contemplated as within the scope of present invention include without limitation any material or construction intended for use as, installation on or application to a walking surface or lower surface of a room or building. Non-limiting examples of flooring articles include rolled flooring, squares, tiles, planks, sheet, laminates and the like which may be installed for example as a so-called "floating" floor or a glued-down floor assembly. As previously noted, information and description set forth in regard to features and elements of the plasticized cellulose ester-based composition aspect or other aspects of the present invention are applicable to and intended to fully support this aspect directed to flooring articles.

In one or more embodiments, the flooring article is a resilient flooring article. In one or more embodiments, the resilient flooring article is a multilayer resilient flooring article or a laminated flooring article. In a non-limiting exemplary embodiment of a multilayer resilient flooring article depicted in FIG. 1, the multilayer resilient flooring article 10 of the present invention includes a core layer 20 and a top layer 40. The multilayer resilient flooring article may also include an optional print layer 30 between the core layer 20 and the top layer 40. The top or wear layer 40 provides scratch and abrasion resistance while also allowing for visibility through the top surface of any underlying print layer design and typically has a thickness of between 15 mils and 25 mils. The base or core layer 20 provides dimensional stability and typically has a thickness of a thickness of at least 75 mils. The print layer 30 may provide a visual color and/or design, for example in the form of geometric patterns or images, and typically has a thickness of between 3 mils and 5 mils. As discussed elsewhere herein, the core layer 20, top layer 40 and print layer 30 may each be a calendered sheet or a calendered film. Other optional layers, such as removable backing layers, adhesive layers and the like, may also be included. Multilayer resilient flooring articles on the type contemplated herein are generally known in the art and are described for example in U.S. Pat. No. 8,071,193, the contents and disclosure of which are incorporated herein by reference.

In one or more embodiments, the flooring article of the present invention may be a multilayer resilient flooring article that includes a core layer of the composition of the present invention. In one or more embodiments wherein the multilayer resilient flooring article includes a print layer, the flooring article of the present invention may be a multilayer resilient flooring article that includes a print layer. of the composition of the present invention. In one or more embodiments, the flooring article is a multilayer resilient flooring article comprising a wear layer, a core layer and a print layer with flooring article comprising a core layer and a print layer both of the composition of present invention. In one or more embodiments, the core layer or the print layer exhibits a haze value of more than 10% or more than 20% or more than 30% or more than 40% when measured in accordance with ASTM D1003 at an article thickness of 60 mils or greater.

Often, and in particular in embodiments where the flooring article is a multilayer resilient flooring article that includes a print layer, it is preferred that the color or design of the print layer be visible to the human eye with clarity and without distortion or variation. In some of these embodiments, the top or wear layer of the multilayer resilient flooring article may be substantially free of the composition of the present invention or may be substantially free of polyvinyl acetal. As used here, the phrase "substantially free" is intended to mean that the cellulose-ester based composition of the layer includes less than 1% by weight polyvinyl acetal based on the total weight of the cellulose ester-based composition.

Specific Embodiments

Embodiment 1. A cellulose ester-based composition comprising cellulose ester and polyvinyl acetal. Embodiment 2. The cellulose-ester based composition of claim 1 wherein said composition comprises a disperse phase of said polyvinyl acetal in a continuous phase of said cellulose ester. Embodiment 3. The composition of any one of Embodiment 1-2 wherein polyvinyl acetal is polyvinyl butyral. Embodiment 4. The cellulose ester-based composition of any one of Embodiments 1-3 wherein the amount of said polyvinyl acetal in said cellulose ester-based composition is between 1% and 49% by weight. Embodiment 5. The cellulose ester-based composition of any one of Embodiments 1-4 wherein the amount of said polyvinyl acetal in said cellulose ester-based composition is at least 3% by weight based on the total weight of the cellulose ester-based composition. Embodiment 6. The cellulose ester-based composition of any one of Embodiments 1-5 wherein the amount of said polyvinyl acetal in said cellulose ester-based composition is no more than 40% by weight based on the total weight of polymer in the cellulose ester-based composition. Embodiment 7. The cellulose ester-based composition of any one of Embodiments 1-6 wherein said composition is a plasticized cellulose ester-based composition further comprising a plasticizer. Embodiment 8. The composition of Embodiment 7 wherein said plasticizer is selected from the group consisting of triethylene glycol 2-ethyl hexanoate, dioctyl adipate, di-n-hexyl azelate and combinations thereof. Embodiment 9. The plasticized cellulose ester-based composition of any one of Embodiments 1-8 wherein said composition has a haze value of more than 10% when measured in accordance with ASTM D1003 at an article thickness of 60 mils or greater. Embodiment 10. The cellulose ester-based composition of any one of Embodiments 1-9 wherein said composition further comprises one or more of roll release agents, processing aids, impact modifiers, fillers such as calcium carbonate, silica, clay, talc, glass beads and glass fibers, flame retardants, lubricants, pigments, dispersing aids, biocides, antistatic agents, water repelling additives, rodenticides, dyes and colorants. Embodiment 11. The composition of any one of Embodiments 1-9 wherein said cellulose ester is selected from the group consisting of cellulose acetate propionate, cellulose acetate butyrate and combinations thereof. Embodiment 12. The composition of Embodiment 11 wherein said cellulose ester is cellulose acetate propionate. Embodiment 13. The composition of any one of Embodiments 1-12 wherein the sum of the percent by weight of said cellulose ester and the percent by weight of said polyvinyl acetal is at least 90 weight % of the total weight of polymer in said composition. Embodiment 14. The composition of Embodiment 13 wherein the sum of the percent by weight of said cellulose ester and the percent by weight of said polyvinyl acetal is at least 95% by weight of the total weight of polymer in said composition. Embodiment 15. The composition of Embodiment 3 wherein said polyvinyl butyral is waste polyvinyl butyral material. Embodiment 16. The composition of Embodiment 15 wherein said waste polyvinyl butyral material comprises a plasticizer. Embodiment 17. The composition of any one of Embodiments 1-16 wherein said polyvinyl acetal is waste polyvinyl butyral material that comprises said plasticizer. Embodiment 18. A flooring article comprising at least one layer of the composition of any one of Embodiments 1-17. Embodiment 19. The flooring article of Embodiment 18 wherein said flooring article is a multilayer resilient flooring article comprising a wear layer, a core layer and an optional print layer, said flooring article comprising a core layer of the composition of any one of Embodiments 1-17. Embodiment 20. The flooring article of Embodiment 18 wherein said flooring article is a multilayer resilient flooring article comprising a wear layer, a core layer and a print layer, said flooring article comprising a core layer and a print layer both of the composition of any one of Embodiments 1-17. Embodiment 21. The flooring article of Embodiment 18 wherein said flooring article is a multilayer resilient flooring article comprising a wear layer, a core layer and a print layer, said flooring article comprising a print layer of the composition of any one of Embodiments 1-17. Embodiment 22. The flooring article of any one of Embodiments 19-21 wherein said wear layer is substantially free of polyvinyl acetal. Embodiment 23. The flooring article of any one of Embodiments 19-21 wherein said core layer has a haze value of more than 10% when measured in accordance with ASTM D1003 at an article thickness of 60 mils or greater.

The following examples, while provided to illustrate with specificity and detail the many aspects and advantages of the present invention, are not be interpreted as in any way limiting its scope. Variations, modifications and adaptations which do depart from the spirit of the present invention will be readily appreciated by one of ordinary skill in the art.

Sample Preparation

To demonstrate the present invention, a control composition (Sample 1 of Table 1 below) including cellulose acetate propionate, triethylene glycol 2-ethyl hexanoate, PA-20 processing aid, OP wax and UFT-FL calcium carbonate was prepared by preblending all ingredients in the amounts indicated in the Table and then roll milling film samples on a Dr. Coiling two roll mill. The roll mill had a roll gap of 0.35 mm and a front roll temperature pg 160° C. and a back roll temperature 165° C.

Test formulations of the present invention (Samples 2 through 8 of Table 1 below) including cellulose acetate propionate, polyvinyl butyral, triethylene glycol 2-ethyl hexanoate, PA-20 processing aid, OP wax, UFT-FL calcium carbonate with varying amounts as indicated in the Table were also prepared by the same procedure. Details regarding the components for each composition in Table 1 are as follows: the cellulose ester is [Tenite™ 482-20, a high viscosity Cellulose Acetate Propionate available from Eastman Chemical Company with a solution ball-drop viscosity of 20 seconds as measured by ASTM D817. PVB Type "A" is a post-industrial laminate glass interlayer waste trim material that included polyvinyl butyral and triethylene glycol di-(2-ethylhexanoate) (3GEH) plasticizer. PVB Type "B" is granulated chip form of the Type "A" PVB with 3 weight % calcium carbonate added. PA20™ is a Kane-Ace® medium molecular weight process aid available from Kaneka. Licowax™ OP is a wax, more particularly a partially saponified calcium salt of montanic acids, and is available from Clariant Corporation. Omya UFT-FL is a calcium carbonate filler.

Analytical Methods

Test specimens of 0.35 mm films were milled from Table 1 formulations for analysis of tensile properties, tear properties, dynamic mechanical, and specific gravity. Tensile properties (ASTM D882) were measured in both the machine and transverse direction. Tear Properties were measured according to ASTM D1922. Specific gravity was determined using ASTM D792. Glass transition temperature was measured using ASTM D4065. Test results are set forth in Table 2, with specimen samples corresponding to the matching formulation sample numbers in Table 1.

Test specimens of 0.35 mm films milled from Table 1 formulations were also used for evaluation of Tan Delta according to ASTM D4065. Test results are set forth in Table 3, with specimen samples corresponding to the matching formulation sample numbers in Table 1.

To demonstrate shear thinning performance, selected Table 1 samples (1-control, 5 and 8) were tested for complex viscosity (in Poise) according to ASTM D-4440 at shear rates varying from 1 $sec^{-1}$ to 400 $sec^{-1}$ at testing temperatures of 150° C., 160° C. and 170° C. in order to calculate a TCVR as described above. Test results are set forth in Table 4, with specimen samples corresponding to the matching formulation sample numbers in Table 1.

TABLE 1

| | Samples (component amounts in parts) | | | | | | | | |
|---|---|---|---|---|---|---|---|---|---|
| Component | 1 | 2 | 3 | 4 | 5 | 6 | 7 | 8 | 9 |
| 482-20 | 139.63 | 139.63 | 139.63 | 139.63 | 139.63 | 139.63 | 139.63 | 139.63 | 139.63 |
| TEG2EH | 41.00 | 39.00 | 36.80 | 34.50 | 31.70 | 39.00 | 36.80 | 34.50 | 31.70 |
| PA 20 (PA) | 4.00 | 4.00 | 4.00 | 4.00 | 4.00 | 4.00 | 4.00 | 4.00 | 4.00 |
| OP wax | 2.10 | 2.30 | 2.50 | 2.70 | 2.90 | 2.30 | 2.50 | 2.70 | 2.90 |
| PVB - A | 0.00 | 19.80 | 41.80 | 67.00 | 93.00 | 0.00 | 0.00 | 0.00 | 0.00 |
| PVB - B UFT-FL | 0.00 | 0.00 | 0.00 | 0.00 | 0.00 | 19.80 | 41.80 | 67.00 | 93.00 |
| Omyacarb CaCO3 | 199.00 | 194.00 | 192.00 | 199.00 | 194.00 | 194.00 | 192.00 | 199.00 | 194.00 |
| Total | 385.73 | 398.73 | 416.73 | 446.83 | 465.23 | 398.73 | 416.73 | 446.83 | 465.23 |

TABLE 2

| | | | | | Machine Direction | | Transverse Direction | |
|---|---|---|---|---|---|---|---|---|
| Specimen Sample No. | Sample Description PVB (wt. %) | DMTA Tg ° C. @ Tan Delta | Specific Gravity | Tear Strength gm-f | Break Strain % | Youngs Modulus Mpa | Break Strain % | Youngs Modulus Mpa |
| 1 | Control | 107 | 1.65 | 42 | 3.97 | 1537 | 1.2 | 1429 |
| 2 | 5% PVB -A | 105 | 1.61 | 32 | 26.65 | 961 | 3.8 | 890 |
| 3 | 10% PVB - A | 108 | 1.57 | 34 | 35.35 | 825 | 4.33 | 785 |
| 4 | 15% PVB - A | 113 | 1.54 | 42 | 28.55 | 794 | 6.36 | 727 |
| 5 | 20% PVB - A | 115 | 1.5 | 33 | 35.5 | 591 | 7.25 | 508 |
| 6 | 5% PVB -B | 106 | 1.61 | 37 | 30.8 | 1157 | 6 | 1023 |
| 7 | 10% PVB - B | 110 | 1.56 | 26 | 34.3 | 906 | 5.34 | 836 |
| 8 | 15% PVB - B | 113 | 1.52 | 27 | 42.46 | 782 | 7 | 734 |

TABLE 3

| Sample Number 4373-37- | PVB Type | PVB wt % | Tan Delta | Tan Delta vs. Control Sample 1 |
|---|---|---|---|---|
| 1 | None | 0 | 0.096 | 0% |
| 2 | A | 5 | 0.135 | 41% |
| 3 | A | 10 | 0.196 | 105% |
| 4 | A | 15 | 0.218 | 127% |
| 5 | A | 20 | 0.202 | 111% |
| 6 | B | 5 | 0.148 | 55% |
| 7 | B | 10 | 0.159 | 66% |
| 8 | B | 15 | 0.221 | 131% |

TABLE 4

| | Sample 1 | Sample 5 | | Sample 8 | |
|---|---|---|---|---|---|
| Temperature ° C. | Complex Viscosity @ 1 $sec^{-1}$ (Poise) | Complex Viscosity @ 1 $sec^{-1}$ (Poise) | % viscosity reduction vs sample 1 | Complex Viscosity @ 1 $sec^{-1}$ (Poise) | % viscosity reduction vs sample 1 |
| 150 | 2560500 | 973693 | 62.0% | 821937 | 67.9% |
| 160 | 2255510 | 572728 | 74.6% | 409855 | 81.8% |
| 170 | 1023970 | 332951 | 67.5% | 239180 | 76.6% |

As demonstrated by the physical property data in Table 2, the compositions of the present invention unexpectedly demonstrate increased toughness versus the control, suggesting improved durability and increased filler loading receptivity over the control, for example in flooring article applications. Improved ductility and lowered modulus also translate to improved machinability.

As demonstrated in the above Table 3, the compositions of the present invention unexpectedly demonstrate a marked increase in Tan Delta values versus the control, suggesting acoustic damping performance that is improved over the control, for example in flooring article applications.

As demonstrated in the above Table 4, the compositions of the present invention unexpectedly demonstrate a marked complex viscosity reduction versus the control, suggesting processability that is improved over the control, for example in flooring article applications.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. A flooring article comprising at least one layer of a cellulose ester-based composition comprising a cellulose ester, from 5% by weight ("wt %") to 49 wt % of a polyvinyl acetal, 0.5 to 1.0 wt % of a roll release agent, 0.5 to 6 wt % of a processing aid, and 1 to 30 wt % of a plasticizer, based on the total weight of polymer in the cellulose ester-base composition, wherein said flooring article is a multilayer resilient flooring article comprising a core layer, a wear layer, and a print layer between the core layer and the wear layer, wherein the at least one layer of a cellulose ester-based composition comprises the core layer and the print layer, and wherein the core layer has a haze value of more than 10% as measured in accordance with ASTM D1003.

* * * * *